United States Patent [19]
Allsup et al.

[11] Patent Number: 5,999,373
[45] Date of Patent: Dec. 7, 1999

[54] BEARING CARTRIDGE FOR A DISC DRIVE

[75] Inventors: David Scott Allsup, Oklahoma City; Jeffery Don Andress, Edmond; Nigel Frank Misso, Bethany, all of Okla.

[73] Assignee: Seagate Technology, Inc., Scotts Valley, Calif.

[21] Appl. No.: 09/052,861

[22] Filed: Mar. 31, 1998

Related U.S. Application Data

[60] Provisional application No. 60/060,308, Sep. 29, 1997.

[51] Int. Cl.$^6$ .................................................. G11B 5/55
[52] U.S. Cl. ............................... 360/106; 384/517
[58] Field of Search ............................. 360/106; 384/517

[56] References Cited

U.S. PATENT DOCUMENTS 5,262,907  11/1993  Duffy et al. .
5,826,987  10/1998  Beaman .................................. 384/517

*Primary Examiner*—Robert S. Tupper
*Attorney, Agent, or Firm*—Crowe & Dunlevy

[57] ABSTRACT

Apparatus for reducing the mass and the responsive inertia of a bearing cartridge for a disc drive actuator assembly, the bearing cartridge including a stationary shaft, a bearing assembly and a bearing sleeve. The bearing assembly is disposed between, and rigidly attached to, the stationary shaft and the bearing sleeve, to facilitate radial movement of the bearing sleeve relative to the stationary shaft. The disc drive actuator assembly has an actuator rigidly attached to, and supported by, the bearing cartridge. The bearing assembly has an inner race rigidly attached to the stationary shaft, and an outer race rollingly engaging a plurality of roller bearings disposed between the inner and outer races. The outer race has a chamfered edge in a plane between a reference vertical axis and a reference horizontal axis, and the bearing sleeve has an internal taper matingly joining the chamfered edge to provide a miter joint therebetween.

11 Claims, 4 Drawing Sheets

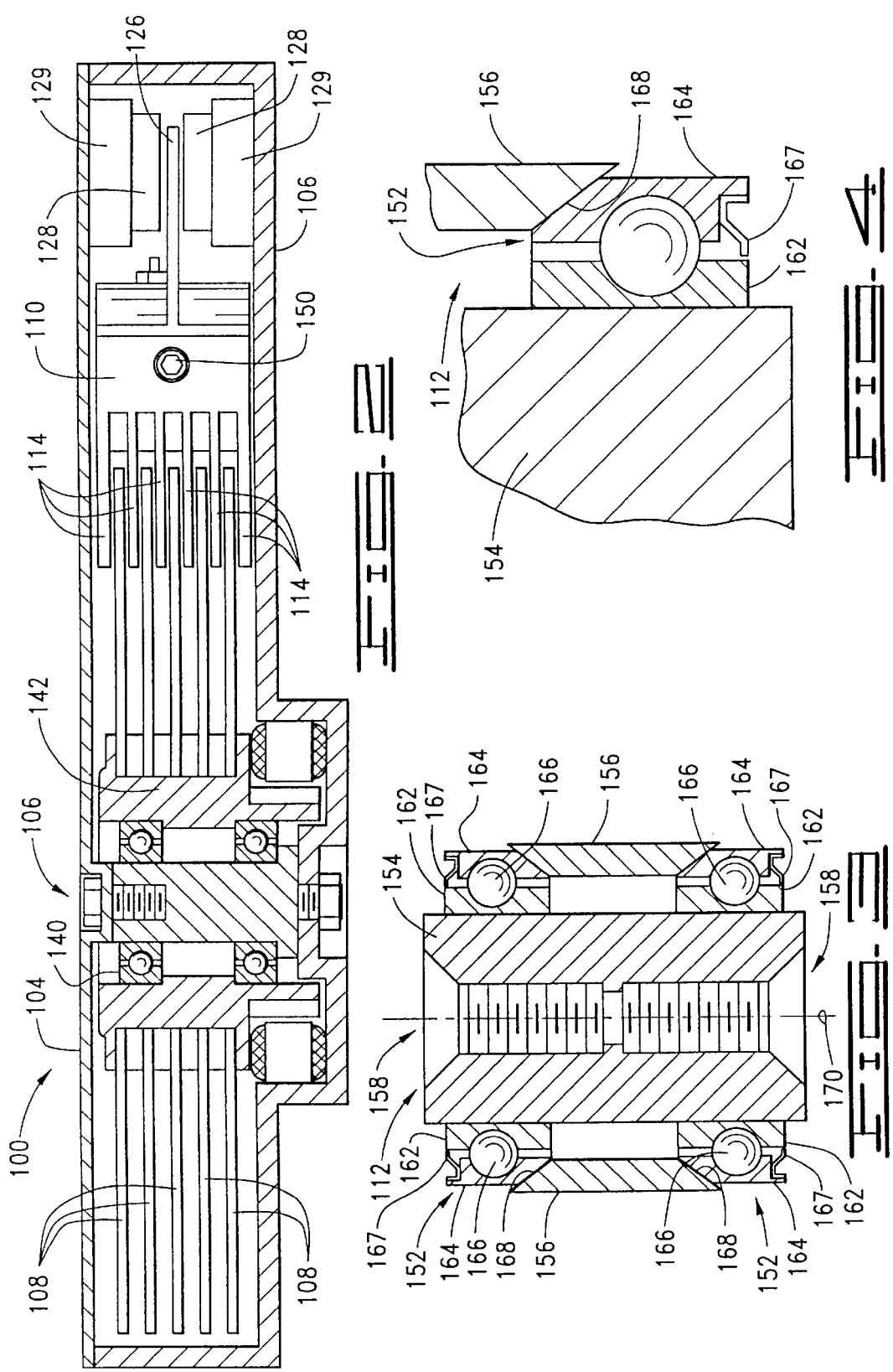

BEARING CARTRIDGE FOR A DISC DRIVE

RELATED APPLICATIONS

This application claims the benefit of United States Provisional Application No. 60/060,308 entitled LOW COST BEARING CARTRIDGE, filed Sep. 29, 1997.

FIELD OF THE INVENTION

This invention relates generally to the field of rotating mechanical devices, and more particularly, but not by way of limitation, to an improved bearing cartridge for a hard disc drive actuator assembly.

BACKGROUND

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of a magnetic circuit comprising one or more permanent magnets and magnetically permeable pole pieces. When controlled DC current is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

Control of the position of the heads is typically achieved with a closed loop servo system such as disclosed in U.S. Pat. No. 5,262,907 entitled HARD DISC DRIVE WITH IMPROVED SERVO SYSTEM issued Nov. 16, 1993 to Duffy et al. (Duffy '907), and assigned to the assignee of the present invention. A typical servo system utilizes servo information (written to the discs during the disc drive manufacturing process) to detect and control the position of the heads through the generation of a position error signal (PES) which is indicative of the position of the head with respect to a selected track. The PES is generated by the servo system by comparing the relative signal strengths of burst signals generated from precisely located magnetized servo fields in the servo information on the disc surface.

During track following in which a selected head is caused to follow a selected track, a servo processor compares the value of the PES to a desired value indicative of the desired position of the head to the selected track and issues a digital correction signal to the power amplifier, which in turn provides an analog current to the actuator coil to adjust the position of the head with respect to the track. During a seek operation in which a selected head is moved from an initial track to a destination track, relatively large currents are applied to the coil to initially accelerate and then decelerate the head towards the destination track. The velocity of the head is repeatedly measured and the current applied to the coil is adjusted in accordance with the difference between the actual velocity of the head and a velocity profile.

As will be recognized, a continuing trend in the industry is to provide characteristics at an ever decreasing cost. To this end, efforts are continually being undertaken to improve disc drive data storage and transfer rates, including increases in the rotational speeds of the discs, increases in track densities and increases in the radial velocities of the heads during seek operations. However, a problem that has been experienced with increases in the radial velocities attained by heads during seeks is the relative mass of the bearing cartridge which produces a limiting inertia force in opposition to the desired movement of the heads.

One way of decreasing the inertial effect is to decrease the mass of the bearing cartridge. Decreasing the mass, however, tends to weaken the structural integrity of the bearing cartridge and thus adversely affect the rotational support and stability of the actuator arm. In order to maintain the necessary stiffness for adequate support of the actuator arm, any mass reduction must be compensated for by an improved structural response of the bearing cartridge construction. Simplicity of manufacture and assembly are also important factors that cannot be sacrificed to any great extent for merely a reduction in mass.

Accordingly, there is a continual need for improvements in bearing cartridge construction that are both operationally effective and inexpensively implemented.

SUMMARY OF THE INVENTION

The present invention provides an apparatus for minimizing the weight, and thus the inertial effect, of the bearing cartridge of a disc drive.

In accordance with the preferred embodiment, the bearing cartridge includes a stationary shaft, a bearing assembly and a bearing sleeve. The bearing assembly is disposed between and rigidly affixed to the stationary shaft and the bearing sleeve to facilitate radial movement of the bearing sleeve relative to the stationary shaft.

The bearing assembly has an upper and a lower roller bearing, with each roller bearing having an inner race attached to the stationary shaft, an outer race, and a plurality of ball bearings rollingly engaged therebetween so that the outer race freely rotates relative to the stationary shaft.

The lower edge of the upper roller bearing outer race and the upper edge of the lower roller bearing outer race are opposingly chamfered. A bearing sleeve has an internal taper at an upper opening and a lower opening, the taper matingly aligned with and closely fitting the chamfer of the outer races so as to provide a closely fitting miter joint therebetween. The upper and lower roller bearings pressingly engage the bearing sleeve at the miter joints to affect a non-slip surfaceto-surface connection therebetween.

These and various other features as well as advantages which characterize the present invention will be apparent from a reading of the following detailed description and a review of the associated drawings.

BRIEF DESCRIPTION OF THE DRAWINGS

FIG. 2 shows a cross-sectional, elevational view of the disc drive of FIG. 1.

FIG. 3 shows a cross-sectional, elevational view of the bearing cartridge of FIGS. 1 and 2.

FIG. 4 provides a cross-sectional, elevational view of a portion of the bearing cartridge of FIG. 3 showing the miter joint of the bearing sleeve and the bearing assembly in greater detail.

DETAILED DESCRIPTION

Figure 1:
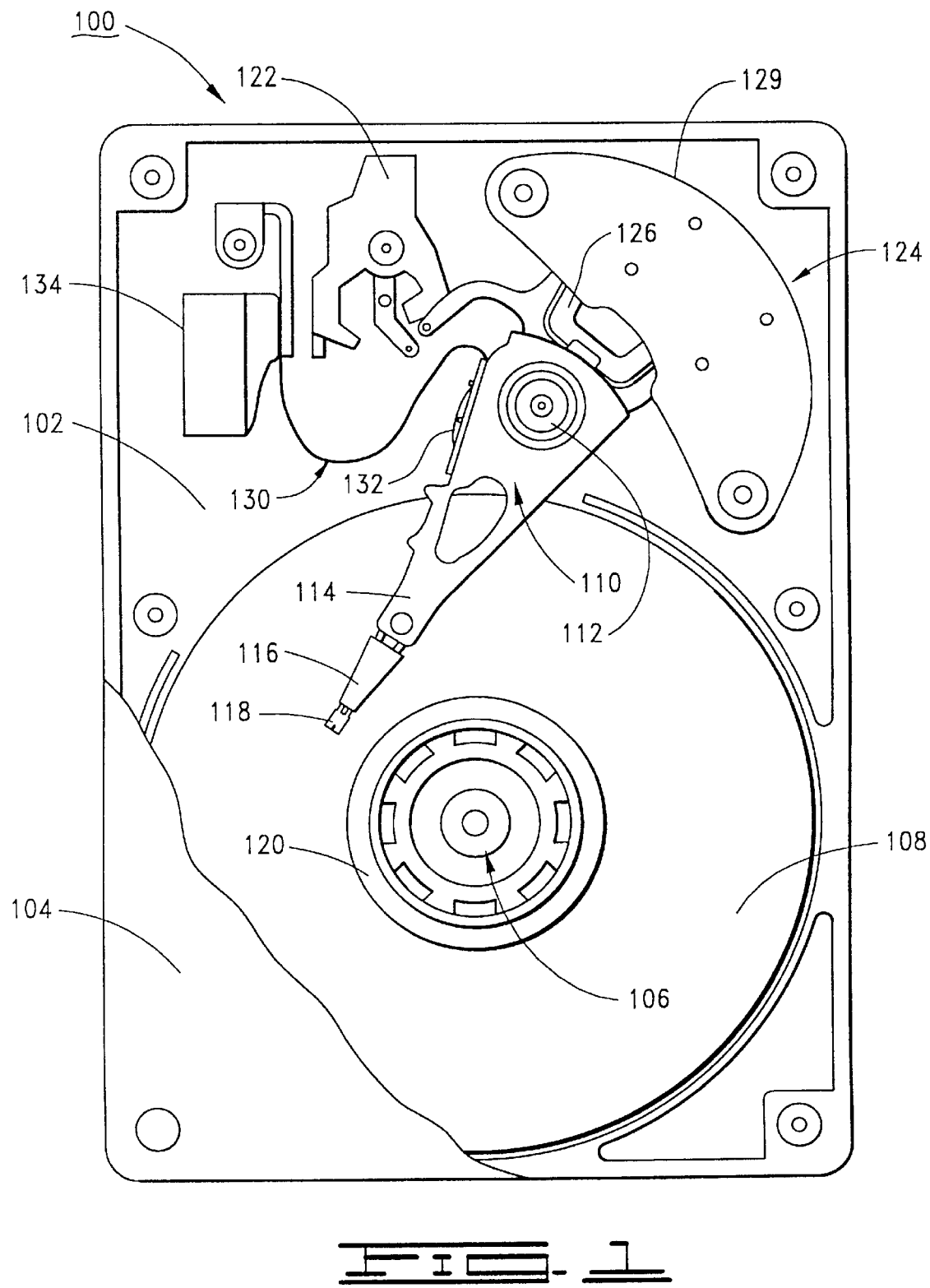
FIG. 1 shows a partially removed view of a disc drive constructed in accordance with the present invention.

Referring now to FIG. 1, shown therein is a disc drive 100 constructed in accordance with the preferred embodiment of the present invention. The disc drive 100 includes a base deck 102 to which various components of the disc drive 100 are mounted. A top cover 104 (shown in partial cutaway fashion) cooperates with the base deck 102 to form a sealed environment for the disc drive in a conventional manner.

A spindle motor (shown generally at 106) rotates one or more discs 108 at a constant high speed. Information is written to and read from tracks (not designated) on the discs 108 through the use of an actuator assembly 110, which rotates about a bearing cartridge 112 positioned adjacent the discs 108. The bearing cartridge 112 will be discussed in greater detail below.

The actuator assembly 110 includes a plurality of actuator arms 114 which extend towards the discs 108, with one or more flexures 116 extending from each of the actuator arms 114. Mounted at the distal end of each of the flexures 116 is a head 118 which includes a slider assembly (not separately designated) designed to enable the head 118 to fly in close proximity to the corresponding surface of the associated disc 108.

At such time that the disc drive 100 is not in use, the heads 118 are moved over landing zones 120 near the inner diameter of the discs 108. The heads 118 are secured over the landing zones 120 through the use of a conventional latch arrangement, such as designated at 122, which prevents inadvertent rotation of the actuator assembly 110 when the heads are parked.

The radial position of the heads 118 is controlled through the use of a voice coil motor (VCM) 124, which as will be recognized typically includes a coil 126 attached to the actuator assembly 110, as well as one or more permanent magnets 128 and corresponding magnetically permeable pole-pieces 129 which establish a magnetic field in which the coil 126 is immersed. Thus, the controlled application of current to the coil 126 causes magnetic interaction between the magnetic field of the VCM 124 and electro-magnetic fields induced in the coil 126 so that the coil 126 moves in accordance with the well known Lorentz relationship. As the coil 126 moves, the actuator assembly 110 pivots about the bearing cartridge 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Referring now to FIG. 2, shown therein is a cross-sectional, elevational view of the disc drive 100 of FIG. 1. As will be recognized by those skilled in the art, features normally associated with the bottom side of the disc drive 100 have been omitted from FIG. 2 for purposes of clarity, such as the disc drive printed circuit board and standoffs used to secure the disc drive 100 within a host computer environment. Moreover, for purposes of clarity the flexures 116 and heads 118 of FIG. 1 are not shown attached to the actuator arms 114 in FIG. 2. As shown in FIG. 2, the disc drive 100 has a total of five discs 108 and six corresponding actuator arms 114.

FIG. 2 illustrates several components of interest, such as remaining portions of the VCM 124. Likewise, the internal configuration of the spindle motor 106 is set forth more fully in FIG. 2 and is shown to comprise bearing assemblies 140 which facilitate rotation of a spindle motor hub assembly 142 about a stationary shaft 144. Rotation of the spindle motor 106 is achieved through the conventional application of current to a plurality of coils 146 and the magnetic interaction therewith by permanent magnets 148 disposed closely adjacent the coils 146. Although the coils 146 are shown in FIG. 2 to be disposed below the discs 108, it will be readily understood that other spindle motor configurations can readily be used, such as the location of the coils between the spindle motor bearings.

FIG. 2 further provides a non-sectional, elevational view of the actuator assembly 110 of FIG. 1. Although not visible in FIG. 2, it will be understood that the bearing cartridge 112 is disposed within the actuator assembly 110 and facilitates radial movement of the actuator assembly 110 relative to the discs 108. The bearing cartridge 112 is secured to the base deck 102 and the top cover 104 by way of suitable hardware (not shown). In the preferred embodiment, the bearing cartridge 112 is further secured within the actuator assembly 110 by way of a recessed set screw 150.

Referring now to FIG. 3, shown therein is a cross-sectional, elevational view of the bearing cartridge 112 of FIG. 1 (as will be recognized, the bearing is not visible in FIG. 2). The bearing cartridge 112 is shown in FIG. 3 to comprise a pair of bearing assemblies 152 disposed between a stationary shaft 154 and a bearing sleeve 156, the bearing assemblies 152 facilitating rotation of the bearing sleeve 156 about the stationary shaft 154. Threaded holes 158 with corresponding beveled openings accommodate the conventional hardware (not shown) used to secure the bearing cartridge 112 to the base deck 102 and the top cover 104 of the disc drive 100, as discussed above.

The bearing assembly 152 has an inner race 162 that is rigidly attached to the stationary shaft 154, such as by a press fit, shrink fit, or by the use of adhesive therebetween. As such, the inner race 162 remains stationary with respect to the rotation of the bearing sleeve 156.

The bearing assembly 152 also has an outer race 164 that is separated from the inner race 162 by a plurality of roller bearings 166. In this manner the outer race 164 freely rotates with respect to the stationary shaft, as the roller bearing 166 rollingly engages both the inner race 162 and the outer race 164. A conventional shield 167 is supported by the outer race 164 and rotates therewith free of the inner race 162 to provide a barrier to particulates that might migrate from the bearing assembly 152 into the disc 108 space of the disc drive 100.

Of particular interest in FIGS. 3 and 4 is the interconnection of the bearing sleeve 156 and the outer race 164. It will be noted that the bearing assemblies 152 have opposing chamfered edges 168, that is, the top bearing assembly 152 has a chamfered bottom edge and the bottom bearing assembly 152 has a chamfered top edge. The bearing sleeve 156 has internally tapered top and bottom surface which matingly align with the chamfered edges of the bearing assemblies 152 to form mitered joints therebetween. The bearing assemblies 152, which are rigidly supported by the stationary shaft 154 as discussed above, compressing press against the bearing sleeve 156 so that the surface-to-surface contact at the miter joint produces a non-slip, frictionally rigid connection therebetween. Clearly, additional mechanical fastening methods could be employed in alternative embodiments of the present invention, such as the well-know use of adhesive, crimping, or upset forming at the miter joint.

In the manner described, the bearing sleeve 156 freely rotates with respect to the stationary shaft 154, and rigidly engages the outer race 164. Attachment of the bearing sleeve 156 to the actuator assembly 110 by the set screw 150 as described above thus provides rotational support to the actuator assembly 110 as the heads 118 radially seek selected data tracks across the discs 108. In an alternative embodiment, the bearing sleeve 156 has a threaded aperture which matingly aligns with the set screw 150 so that the actuator 110 and the bearing sleeve 156 are threadingly coupled for joint rotation.

The slope of the chamfer 168 and the mating internal taper of the bearing sleeve 156 can be selected to optimize the strength provided by the bearing cartridge 112, in response to the requirements of the disc drive 100. With respect to a vertical axis 170 of the bearing assembly 112 (FIG. 3), the slope of the chamfer 168 will be a selected angle between that of the vertical axis 170 and that of an angle orthogonal to the vertical axis 170.

Figure 5:
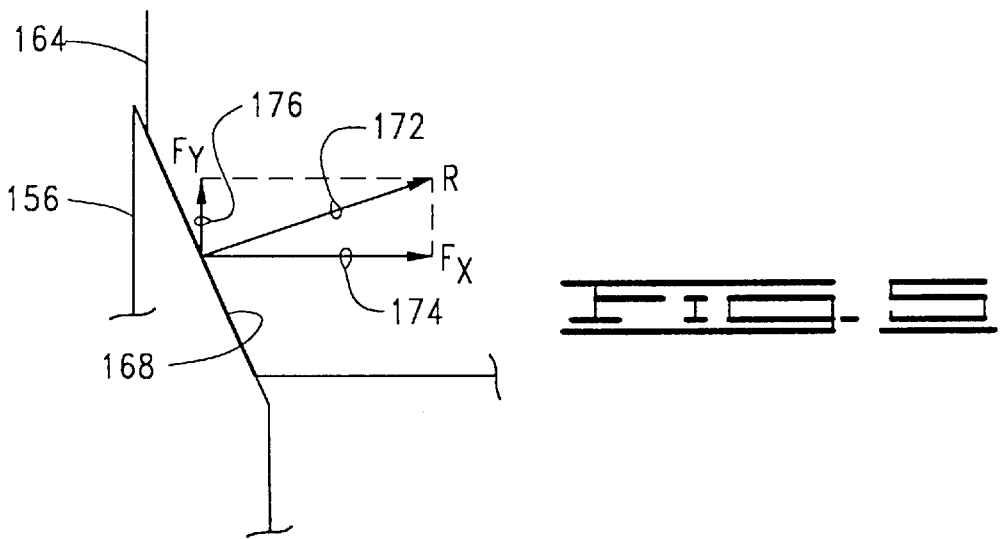
FIGS. 5 through 7 are diagrammatic views showing the component force differences between a steep sloped and the shallow sloped miter joint of FIG. 3 and FIG. 4.
Figure 6:
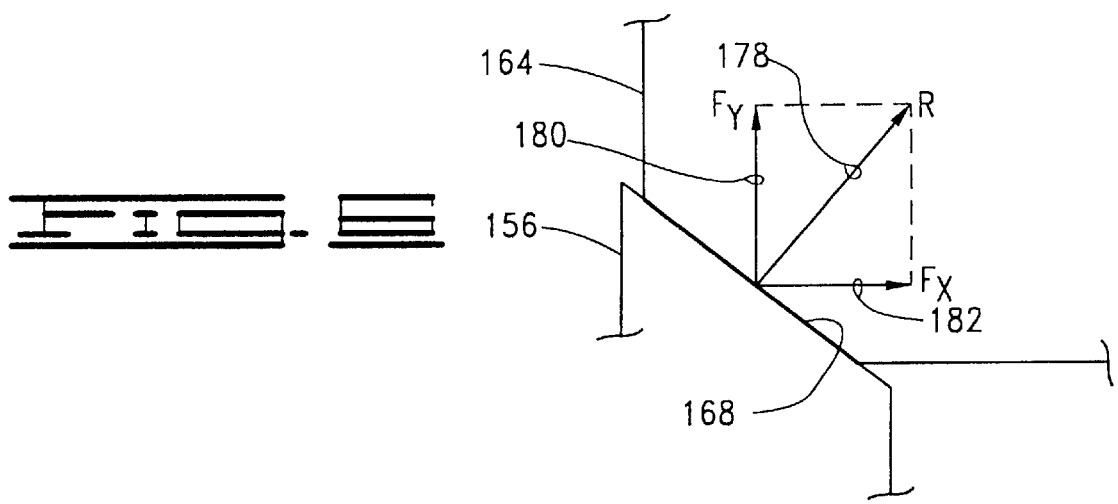
Figure 7:
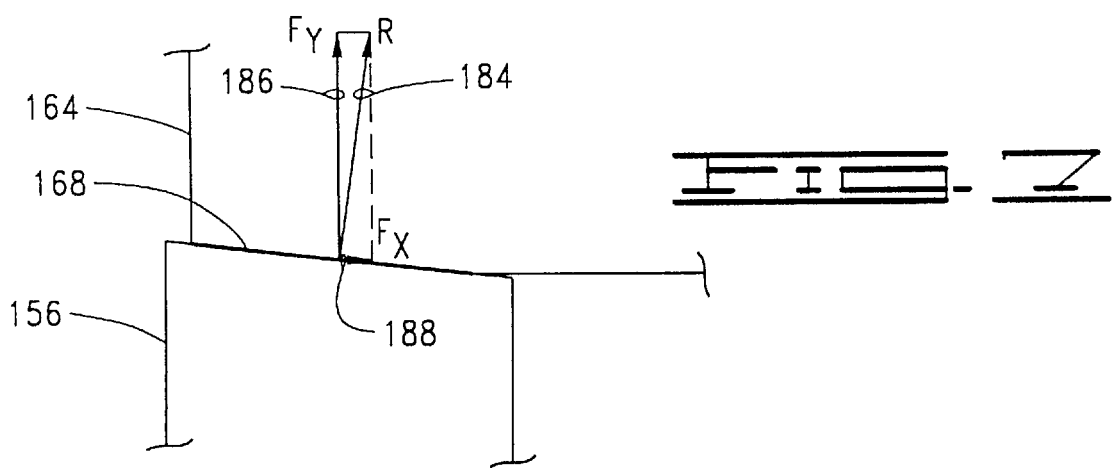

Turning to FIGS. 5 through 7, which diagrammatically show the chamfer 168 portion of the outer race 164 and the internal taper portion of the bearing sleeve 156. It will be noted that the characteristic strength of the bearing cartridge 112 is dependent on the slope of the chamfer 168 due to the effect that the chamfer 168 has on the supporting force imparted by the bearing sleeve 156 on the bearing assemblies 152. Each of FIGS. 5 through 7 shows diagrammatically a resultant force vector "R" which represents the supporting force of the bearing sleeve 156, which acts in a direction perpendicular to the mating surfaces, or the chamfer 168 surface. In FIG. 5, the chamfer 168 has a steep slope relative to the vertical axis 170 (FIG. 3), and it will be noted that the resultant force vector 172 has a greater component of force in a direction orthogonal to the vertical axis 170, shown as Fx 174, than the component of force in a direction parallel to the vertical axis 170, shown as Fy 176. In FIG. 6, the chamfer 168 has a slope that forms a forty-five degree angle with respect to the vertical axis 170. It will be noted that the resultant force vector 178 has a component of force parallel to the vertical axis 170, Fy 180, that is substantially equivalent to a component of force orthogonal to the vertical axis 170, Fx 182. Finally in FIG. 7, the chamfer 168 has a slope that forms a relatively shallow slope relative to the vertical axis 170, and it will be further noted that the resultant force vector 184 has a greater component of force in a direction parallel to the vertical axis 170, shown as Fy 186, than the component of force in a direction orthogonal to the vertical axis 170, shown as Fx 188.

Force provided by the bearing sleeve 156 in a direction parallel to the vertical axis 170 increases the axial stiffness of the bearing cartridge 112. Force provided by the bearing sleeve 156 in a direction orthogonal to the vertical axis increases the lateral stiffness of the bearing cartridge 112. By using a relatively steep slope as shown in FIG. 5, more of the supporting force of the bearing sleeve 156 is directed to the lateral stiffness. By using a relatively shallow slope as shown in FIG. 7, more of this supporting force is directed toward axial stiffness. In this manner the slope 168 can be determined to best provide the characteristic strength in the bearing cartridge as required by the disc drive. For all angles, however, it will be noted that the support provided by the bearing sleeve 156 acts to provide both axial and lateral stiffness.

Figure 8:
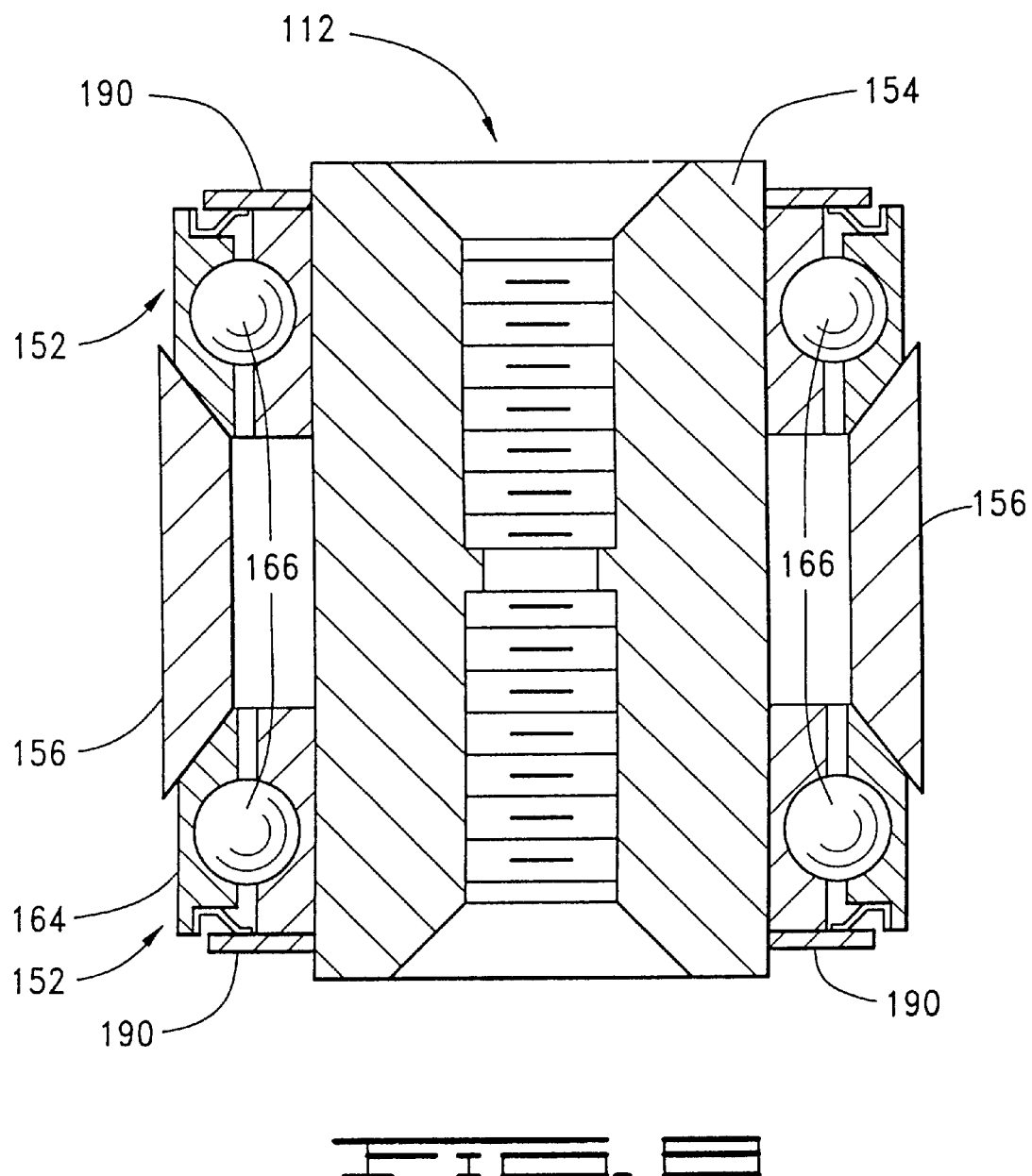
FIG. 8 is a cross-sectional, elevational view of the bearing cartridge of FIG. 3, with a pair of retention discs to prevent particulate migration from the bearing assemblies.

FIG. 8 is shows an alternative embodiment wherein a conventional retention disc 190 is used in the bearing cartridge 112 to further prevent particulate migration from the bearing assembly 152 into the disc 108 space. The retention disc 190 of FIG. 8 is rigidly attached to the stationary shaft 154, such as by a press fit or by adhesive, and does not impede the rotation of the outer race 164 and bearing sleeve 156. The retention disc 190 and the shield 167 cooperate to provide a labyrinth seal for an enhanced barrier to minimize particulate migration from the bearing assembly 152.

One skilled in the art will appreciate the reduction in mass achieved by the bearing cartridge 112 of the present invention, in that the size of the bearing sleeve 156 has been significantly reduced. By reducing the mass of the moving portion of the bearing cartridge 112, the inertial effect is likewise reduced, making it possible for the actuator arm to be more responsive to data track seek operations. The reduced size also provides cost savings and reduced complexity in the bearing cartridge 112. The miter joint connection of the bearing sleeve 156 to the bearing assembly 152 provides a lighter weight, yet stronger bearing cartridge assembly.

From the foregoing discussion it will now be clear that the present invention is directed to an apparatus for minimizing the weight, and thus the inertial response, of a bearing cartridge (such as 112) for an actuator (such as 110) of a disc drive (such as 100).

The bearing cartridge has a stationary shaft (such as 154) with threaded openings (such as 158) to receive fasteners for attachment to the disc drive top cover (such as 104) and base deck (such as 102). A bearing assembly (such as 152) rotatably supports a bearing sleeve (such as 156) which is attached to the actuator. In this manner, the rotation of the bearing sleeve about the stationary shaft supports the actuator which moves radially to position a head (such as 118) over a plurality of data tracks on a rotating disc (such as 108).

The bearing assembly has an inner race (such as 162) which is rigidly attached to the stationary shaft, and a rotating outer race (such as 164) which rollingly engages a plurality of roller bearings (such as 166) between the inner and outer races. The bearing sleeve engages the outer race to provide a non-slip frictionally rigid connection.

The bearing cartridge is made lighter and thus more responsive by the reduced size of the bearing sleeve. To compensate for the strength loss resulting from the smaller bearing sleeve, a miter joint connection is provided between the bearing sleeve and the bearing assemblies. This is achieved by a chamfered edge (such as 168) on the outer race of the bearing assembly which matingly joins an internal taper on the opening of the bearing sleeve.

The miter joint provides both axial and lateral stiffness to the bearing cartridge. The proportion of axial to lateral stiffness provided by the miter joint can be manipulated to meet the strength requirements of the disc drive. A chamfer that is steeper than 45 degrees from a reference vertical axis provides proportionally more axial stiffness than lateral stiffness. Contrarily, a chamfer that is less than 45 degrees from a reference vertical axis provides proportionally more lateral stiffness than axial stiffness. A chamfer that forms a 45 degree angle with a reference vertical axis provides substantially equivalent axial and lateral stiffness.

A conventional retention disc (such as 190) covers the bearing assembly to prevent particulate migration therefrom. Finally, it will be understood that the bearing cartridge described above provides a more responsive support to enable faster and more accurate data seek routines. Other benefits stem from a cost reduction and a reduction in complexity of the assembly.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A bearing cartridge, comprising:

a stationary shaft;

a first bearing assembly having an inner race and an outer race, the inner race rigidly affixed to the shaft and the outer race having a chamfered outer surface;

a second bearing assembly having an inner race and an outer race the inner race rigidly affixed to the shaft and the outer race having a chamfered outer surface; and a bearing sleeve rigidly engaging the outer race of the first and second bearing assemblies, wherein the bearing sleeve has tapered inner surfaces which matingly cooperate with the chamfered outer surfaces of the first and second bearing assemblies to form miter joints between the bearing sleeve and the first and second bearing assemblies.

2. The bearing cartridge of claim 1 wherein the stationary shaft has a proximate end with a threaded aperture along a longitudinal central axis, and a co-linear threaded aperture at a distal end of the stationary shaft.

3. The bearing cartridge of claim 2 wherein each of the chamfered outer surfaces of the outer races is in a plane that lies between a plane containing the longitudinal central axis and a plane orthogonal to the longitudinal central axis.

4. The bearing cartridge of claim 3, wherein the engagement of the bearing sleeve to the first and second bearing assemblies simultaneously provides axial stiffness and lateral stiffness to the bearing cartridge.

5. The bearing cartridge of claim 4 further comprising retention discs supported by the stationary shaft and covering the bearing assemblies to minimize migration of particulates from the bearing assemblies.

6. A disc drive, comprising:

a base deck;

a spindle motor connected to the base deck, the spindle motor having a rotatable spindle motor hub;

a disc connected to the spindle motor hub; and an actuator assembly connected to the base deck, the actuator assembly comprising:

an actuator arm disposed in a direction adjacent the disc;

a flexure extending from the actuator arm;

a read/write head connected to the flexure; and a bearing cartridge facilitating radial movement of the read/write head with respect to the disc, the bearing cartridge comprising:

a stationary shaft;

a pair of bearing assemblies each having an inner race and an outer race, each inner race rigidly affixed to the shaft and each outer race having a chamfered outer surface;

a bearing sleeve rigidly engaging the outer race of each bearing assembly, wherein the bearing sleeve has internally tapered surfaces which matingly cooperate with each outer race chamfered outer surface to form miter joints between the bearing sleeve and the first and second bearing assemblies.

7. The disc drive of claim 6 further comprising a top cover attached to the base deck, the top cover and the base deck cooperating to form a sealed interior environment for the disc drive.

8. The disc drive of claim 7 wherein the stationary shaft has threaded apertures at a proximate and distal end, and further comprising fasteners which attach the top cover and the base deck by receiving engagement of the fasteners in the threaded apertures.

9. The disc drive of claim 8 wherein the stationary shaft has a reference vertical axis, and wherein the chamfered outer surface of each outer race is in a plane that lies between a plane containing the reference vertical axis and a plane orthogonal to the reference vertical axis.

10. The disc drive of claim 9, wherein the engagement of the bearing sleeve to the bearing assemblies simultaneously provide axial stiffness and lateral stiffness to the bearing cartridge.

11. The disc drive of claim 10 wherein the bearing cartridge further comprises a pair of retention discs supported by the stationary shaft which cover the bearing assemblies to minimize migration of particulates from the bearing assemblies.

* * * * *

UNITED STATES PATENT AND TRADEMARK OFFICE
CERTIFICATE OF CORRECTION

PATENT NO. : 5,999,373 Page 1 of 1
DATED : December 7, 1999
INVENTOR(S) : David S. Allsup, Jeffrey D. Andress and Nigel F. Misso It is certified that error appears in the above-identified patent and that said Letters Patent is hereby corrected as shown below:

Title page,
Item [75] Inventors replace "Jeffery" with -- Jeffrey --.

Column 6,
Line 14, replace "is" with -- --

Column 7,
Line 33, replace "outer race the inner" with -- outer race, the inner --.

Signed and Sealed this

Twenty-first Day of May, 2002

Attest:

Attesting Officer

JAMES E. ROGAN
*Director of the United States Patent and Trademark Office*